United States Patent
Choi et al.

(10) Patent No.: US 12,523,938 B2
(45) Date of Patent: Jan. 13, 2026

(54) METHOD FOR SETTING OF SEMICONDUCTOR MANUFACTURING PARAMETER AND COMPUTING DEVICE FOR EXECUTING THE METHOD

(71) Applicants: RESEARCH COOPERATION FOUNDATION OF YEUNGNAM UNIVERSITY, Gyeongsangbuk-do (KR); POSTECH Research and Business Development Foundation, Gyeongsangbuk-do (KR)

(72) Inventors: Hyun Chul Choi, Gyeongsangbuk-do (KR); Rock Hyun Baek, Gyeongsangbuk-do (KR); Jun Sik Yoon, Gyeongsangbuk-do (KR); Hyeok Yun, Gyeongsangbuk-do (KR)

(73) Assignees: RESEARCH COOPERATION FOUNDATION OF YEUNGNAM UNIVERSITY, Gyeongsangbuk-do (KR); POSTECH Research and Business Development Foundation, Gyeongsangbuk-do (KR)

( * ) Notice: Subject to any disclaimer, the term of this patent is extended or adjusted under 35 U.S.C. 154(b) by 1064 days.

(21) Appl. No.: 17/551,450

(22) Filed: Dec. 15, 2021

(65) Prior Publication Data
US 2022/0277189 A1    Sep. 1, 2022

(51) Int. Cl.
*G06N 3/045* (2023.01)
*G03F 7/00* (2006.01)

(52) U.S. Cl.
CPC .................. *G03F 7/705* (2013.01)

(58) Field of Classification Search
CPC ...... G03F 7/705; G06N 3/045; G06N 3/0499; G06N 3/09; G06N 3/084; G06N 3/049
See application file for complete search history.

(56) References Cited

U.S. PATENT DOCUMENTS

| | | | | |
|---|---|---|---|---|
| 2015/0286766 A1* | 10/2015 | Singh | ............... | G06F 30/392 716/121 |
| 2019/0146455 A1* | 5/2019 | Beylkin | ............... | G06F 30/392 700/97 |

FOREIGN PATENT DOCUMENTS

| | | |
|---|---|---|
| JP | 2018-63561 A | 4/2018 |
| KR | 10-2019-0003909 A | 1/2019 |

OTHER PUBLICATIONS

Office action issued on Nov. 29, 2022 from Korean Patent Office in a counterpart Korean Patent Application No. 10-2020-0133780 (all the cited references are listed in this IDS.) (English translation is also submitted herewith.).

(Continued)

*Primary Examiner* — Jack Chiang
*Assistant Examiner* — Anwer Ahmed Alawdi
(74) *Attorney, Agent, or Firm* — The PL Law Group, PLLC

(57) ABSTRACT

A method for setting of a semiconductor manufacturing parameter according to an embodiment is a method performed in a computing device including one or more processors, and a memory for storing one or more programs executed by the one or more processors, the method including an operation of inputting manufacturing parameters for manufacturing a semiconductor to a neural network model and an operation of training the neural network model to predict at least one of power and delay of the semiconductor based on the input manufacturing parameters.

21 Claims, 12 Drawing Sheets

(56) References Cited

OTHER PUBLICATIONS

Sachin Maheshwari et al., "Logical effort based Power-Delay-Product Optimization", International Conference on Advances in Computing, Communications, and Informatics (ICACCI), 2014.

* cited by examiner

FIG. 3

| Input parameter | Symbol | Unit | Reference | Max | Min |
|---|---|---|---|---|---|
| Gate length | $L_g$ | $nm$ | 30 | 34.5 | 25.5 |
| Spacer length | $L_{sp(s/d)}$ | $nm$ | 20 | 21 | 19 |
| Contact length | $L_{con(s/d)}$ | $nm$ | 40 | 42 | 38 |
| Oxide thickness | $T_{ox}$ | $nm$ | 0.7 | 0.805 | 0.595 |
| High-K thickness | $T_{hk}$ | $nm$ | 2 | 2.3 | 1.7 |
| Doping concentration | $N_{ch}$ | $10^{18}\ cm^{-3}$ | 1 | 1.25 | 0.75 |
| | $N_{halo(s/d)}$ | $10^{18}\ cm^{-3}$ | 5 | 6.25 | 3.75 |
| | $N_{sd(s/d)}$ | $10^{20}\ cm^{-3}$ | 1 | 1.25 | 0.75 |
| Junction gradient | $L_{haloj(s/d)}$ | $nm$ | 10 | 10.5 | 9.5 |
| | $L_{sdj(s/d)}$ | $nm$ | 25 | 26.25 | 23.75 |
| Gate stack height | $T_g$ | $nm$ | 50 | 52.5 | 47.5 |
| S/D epi height | $T_{s/d(s/d)}$ | $nm$ | 10 | 10.5 | 9.5 |

FIG. 5

| Repeat number | | 1 | 10 | 20 | 30 | 40 | 50 | 60 | 70 | 80 | 90 | 100 |
|---|---|---|---|---|---|---|---|---|---|---|---|---|
| PDP ×10$^{-15}$ (×10$^{-18}$) | predicted | 0.3071 (0.9429) | 0.3066 (0.0079) | 0.3066 (0.0002) | 0.3066 (0.0002) | 0.3066 (0.0002) | 0.3066 (0.0002) | 0.3066 (0.0001) | 0.3066 (0.0002) | 0.3066 (0.0001) | 0.3066 (0.0001) | 0.3066 (0.0002) |
| | simulated | 0.3110 (0.9578) | 0.3118 (0.0938) | 0.3120 (0.0007) | 0.3120 (0.0047) | 0.3120 (0.0006) | 0.3120 (0.0009) | 0.3120 (0.0006) | 0.3120 (0.0046) | 0.3120 (0.0007) | 0.3120 (0.0047) | 0.3120 (0.0047) |
| Delay ×10$^{-11}$ (×10$^{-13}$) | predicted | 0.1661 (0.2284) | 0.1684 (0.0008) | 0.1685 (0.0005) | 0.1685 (0.0003) | 0.1685 (0.0006) | 0.1685 (0.0004) | 0.1685 (0.0003) | 0.1685 (0.0005) | 0.1685 (0.0006) | 0.1685 (0.0005) | 0.1685 (0.0004) |
| | simulated | 0.1684 (0.2705) | 0.1699 (0.0041) | 0.1699 (0.0005) | 0.1699 (0.0019) | 0.1699 (0.0004) | 0.1699 (0.0006) | 0.1698 (0.0004) | 0.1699 (0.0019) | 0.1699 (0.0005) | 0.1699 (0.0019) | 0.1699 (0.0019) |
| Power ×10$^{-3}$ (×10$^{-5}$) | predicted | 0.1849 (0.3095) | 0.1830 (0.0339) | 0.1819 (0.0008) | 0.1819 (0.0003) | 0.1819 (0.0007) | 0.1819 (0.0005) | 0.1819 (0.0006) | 0.1819 (0.0019) | 0.1819 (0.0006) | 0.1819 (0.0005) | 0.1819 (0.0019) |
| | simulated | 0.1847 (0.2990) | 0.1835 (0.0365) | 0.1836 (0.0005) | 0.1836 (0.0018) | 0.1836 (0.0004) | 0.1836 (0.0007) | 0.1836 (0.0004) | 0.1836 (0.0017) | 0.1836 (0.0005) | 0.1836 (0.0018) | 0.1836 (0.0018) |

FIG. 9

| Parameter | PDP sensitivity (dy) | Parameter | PDP sensitivity (dy) |
|---|---|---|---|
| $L_g$ | $6.8710 \times 10^{-17}$ | $T_{s/d(s)}$ | $-7.1042 \times 10^{-18}$ |
| $N_{sd(s)}$ | $3.7977 \times 10^{-17}$ | $L_{sp(d)}$ | $5.1539 \times 10^{-18}$ |
| $T_{ox}$ | $-2.9362 \times 10^{-17}$ | $T_{s/d(d)}$ | $3.7916 \times 10^{-18}$ |
| $L_{sdj(s)}$ | $2.1586 \times 10^{-17}$ | $L_{haloj(d)}$ | $3.4982 \times 10^{-18}$ |
| $T_{hk}$ | $-1.7121 \times 10^{-17}$ | $T_g$ | $2.5350 \times 10^{-18}$ |
| $L_{sp(s)}$ | $-1.7022 \times 10^{-17}$ | $N_{ch}$ | $-1.1027 \times 10^{-18}$ |
| $N_{sd(d)}$ | $-1.3028 \times 10^{-17}$ | $L_{con(s)}$ | $9.1408 \times 10^{-19}$ |
| $N_{halo(s)}$ | $-1.2078 \times 10^{-17}$ | $L_{haloj(s)}$ | $-8.1754 \times 10^{-19}$ |
| $L_{sdj(d)}$ | $-1.0712 \times 10^{-17}$ | $L_{con(d)}$ | $-4.1220 \times 10^{-20}$ |
| $N_{halo(d)}$ | $1.0056 \times 10^{-17}$ | | |

FIG. 10

| Parameters (0,0) | Delay sensitivity (dy) | Power sensitivity (dy) |
|---|---|---|
| $L_{con(d)}$ | $1.0306 \times 10^{-14}$ | $-1.1441 \times 10^{-6}$ |
| $L_{haloj(d)}$ | $1.1255 \times 10^{-14}$ | $8.5549 \times 10^{-7}$ |
| $L_{con(s)}$ | $-4.4003 \times 10^{-15}$ | $1.0203 \times 10^{-6}$ |
| $T_g$ | $-1.5111 \times 10^{-16}$ | $1.5210 \times 10^{-6}$ |

| Parameters (±,0) | Delay sensitivity (dy) | Power sensitivity (dy) |
|---|---|---|
| $L_{sdj(d)}$ | $-7.5297 \times 10^{-14}$ | $1.6981 \times 10^{-6}$ |
| $N_{sd(d)}$ | $-7.4103 \times 10^{-14}$ | $2.5266 \times 10^{-7}$ |
| $N_{halo(d)}$ | $4.0869 \times 10^{-14}$ | $1.5459 \times 10^{-6}$ |
| $L_{sp(d)}$ | $3.5057 \times 10^{-14}$ | $-7.1222 \times 10^{-7}$ |
| $T_{s/d(d)}$ | $3.2589 \times 10^{-14}$ | $-1.2461 \times 10^{-6}$ |

| Parameters (0,±) | Delay sensitivity (dy) | Power sensitivity (dy) |
|---|---|---|
| $T_{ox}$ | $-1.7130 \times 10^{-15}$ | $-1.7213 \times 10^{-5}$ |

| Parameters (±,±) | Delay sensitivity (dy) | Power sensitivity (dy) |
|---|---|---|
| $L_g$ | $2.8058 \times 10^{-13}$ | $1.0096 \times 10^{-5}$ |

| Parameters (±,∓) | Delay sensitivity (dy) | Power sensitivity (dy) |
|---|---|---|
| $N_{sd(s)}$ | $-4.6829 \times 10^{-13}$ | $7.1839 \times 10^{-5}$ |
| $N_{halo(s)}$ | $3.0951 \times 10^{-13}$ | $-4.2408 \times 10^{-5}$ |
| $L_{sdj(s)}$ | $-2.7648 \times 10^{-13}$ | $5.0168 \times 10^{-5}$ |
| $L_{sp(s)}$ | $2.2607 \times 10^{-13}$ | $-3.9581 \times 10^{-5}$ |
| $N_{ch}$ | $1.8004 \times 10^{-13}$ | $-2.0630 \times 10^{-5}$ |
| $T_{s/d(s)}$ | $1.1989 \times 10^{-13}$ | $-1.8421 \times 10^{-5}$ |
| $L_{haloj(s)}$ | $7.0730 \times 10^{-14}$ | $-8.4648 \times 10^{-6}$ |
| $T_{hk}$ | $3.5765 \times 10^{-14}$ | $-1.4148 \times 10^{-5}$ |

METHOD FOR SETTING OF SEMICONDUCTOR MANUFACTURING PARAMETER AND COMPUTING DEVICE FOR EXECUTING THE METHOD

CROSS REFERENCE TO RELATED APPLICATIONS AND CLAIM OF PRIORITY

This application claims priority to Korean Patent Application No. 10-2020-0133780 filed on Oct. 15, 2020 in the Korean Intellectual Property Office (KIPO), the entire disclosures of which are incorporated by reference herein.

BACKGROUND

1. Technical Field

The disclosed embodiments relate to a technology for setting of a semiconductor manufacturing parameter.

2. Background Art

A transistor process is the most basic and core technology in the semiconductor industry. Therefore, it is very important to develop a high-performance and low-power transistor. In general, in order to find optimal manufacturing parameters for high-performance and low-power transistors, repeated wafer manufacturing accompanied by feedback loops for hundreds of unit process designs and unit process manufacturing to measure electrical performance is required. This procedure not only takes up to several weeks, but also significantly increases the cost of research and development.

SUMMARY

The disclosed embodiments are intended to provide novel techniques for finding manufacturing parameters that can optimize semiconductor performance.

A method for setting of a semiconductor manufacturing parameter according to a disclosed embodiment is a method performed in a computing device including one or more processors, and a memory for storing one or more programs executed by the one or more processors, the method including an operation of inputting manufacturing parameters for manufacturing a semiconductor to a neural network model and an operation of training the neural network model to predict at least one of power and delay of the semiconductor based on the input manufacturing parameters.

The operation of inputting into the neural network model may input a value obtained by taking a log of the manufacturing parameters to the neural network model.

The operation of training the neural network model may train the neural network model to predict at least one of the power and delay of the semiconductor within a range of a preset minimum value to maximum value for each of the manufacturing parameters.

The neural network model may include a first neural network model configured to receive each manufacturing parameter and is trained to predict the power of the semiconductor from each received manufacturing parameter; and a second neural network model configured to receive each manufacturing parameter and is trained to predict the delay of the semiconductor from each received manufacturing parameter.

The operation of inputting into the neural network model may input a value obtained by taking a log of the manufacturing parameters to the neural network model, and loss functions of the first neural network model and the second neural network model may be represented by Equation 1 below.

$$L_y = \frac{1}{N}\sum_{i}^{N} \|\log(O_y^i) - \log(D_y^i)\|^2, \ y = \text{power or delay} \quad \text{(Equation 1)}$$

$L_y$: loss function of the first neural network model when y=power, loss function of the second neural network model when y=delay N: the number of training data of the first neural network model and the second neural network model i: i-th training data $\log(O_y^i)$: predicted value of the first neural network model (when y=power) and the second neural network model (when y=delay) for the i-th training data $\log(D_y^i)$: target value of the first neural network model (when y=power) and the second neural network model (when y=delay) for the i-th training data The neural network model is trained to predict each of the power and the delay of the semiconductor from each inputted manufacturing parameter, and the method for setting of the semiconductor manufacturing parameter may further include an operation of calculating power delay products (PDP) based on the power and the delay predicted by the neural network model.

The method for setting of the semiconductor manufacturing parameter may further include an operation of extracting values of manufacturing parameters that minimize the PDP by using the trained neural network model.

The operation of extracting the values of the manufacturing parameters that minimize the PDP may extract values of the manufacturing parameters that minimize the PDP by applying a gradient descent method to the trained neural network model.

The operation of extracting the values of the manufacturing parameters that minimize the PDP by applying the gradient descent method may include an operation of setting an initial value of each manufacturing parameter and a learning rate of the neural network model, an operation of calculating a slope of the PDP with respect to the initial value of the manufacturing parameter and updating the manufacturing parameter for moving the slope of the PDP in a negative direction using the learning rate, and an operation of repeating the operation of updating until a preset interruption condition is satisfied.

The operation of inputting to the neural network model may input the value obtained by taking a log of the manufacturing parameters to the neural network model, a slope G(x) of the PDP may be calculated through Equation 2 below, and the update of the manufacturing parameter may be performed through Equation 3 below.

$$G(x) = \frac{d(\log(PDP))}{dx} \quad \text{(Equation 2)}$$

$$x^{t+1} = x^t - \gamma \cdot G(x^t), \ x^t = \log(I_p^t) \quad \text{(Equation 3)}$$

γ: learning rate of neural network model $I_p^t$: manufacturing parameter value input to neural network model at time t $x^t$: log-scaled manufacturing parameter input to neural network model at time t The preset interruption condition may include one or more of a first condition in which the calculated PDP is less than or equal to a preset target value, a second condition in which the slope of the PDP is less than or equal to a preset threshold slope, and a third condition in which an updated amount of change of the manufacturing parameter is equal to or less than a preset threshold change amount.

The operation of extracting the values of the manufacturing parameters that minimize the PDP by applying the gradient descent method may further include an operation of limiting a range of input values of the manufacturing parameters so that the manufacturing parameters are input to the neural network model within a range of a pre-learned minimum value to maximum value.

The operation of limiting the range of input values of the manufacturing parameters may further include an operation of receiving an input of a latent value having an unrestricted arbitrary value and an operation of outputting the input latent value to the neural network model by allowing the input latent value to be within the range of the pre-learned minimum value to maximum value by using a limiter function.

The operation of inputting into the neural network model may input a value obtained by taking a log of the manufacturing parameters to the neural network model, and the operation of allowing the latent value to be within the range of the pre-learned minimum value to maximum value may be implemented through Equation 4 below.

$$g(z_p) = \text{sig}(z_p) \cdot (\log(I_p^{max}) - \log(I_p^{min})) + \log(I_p^{min}) \quad \text{(Equation 4)}$$

$g(z_p)$: limiter function
$z_p$: latent value
$I_p^{min}$: pre-learned minimum value of manufacturing parameter
$I_p^{max}$: pre-learned maximum value of manufacturing parameter
sig: sigmoid function, $$sig(z_p) = \frac{1}{1 + e^{-z_p}}$$

The slope $\hat{G}(x)$ of the PDP may be calculated through Equation 5 below, and the update of the manufacturing parameter may be performed through Equation 6 below.

$$\hat{G}(x) = \frac{\log(PDP \cdot g(x + \frac{\tau}{2})) - \log(PDP \cdot g(x - \frac{\tau}{2}))}{\tau}, \tau \approx 0 \quad \text{(Equation 5)}$$

$$x^{t+1} = x^t - \gamma \cdot \hat{G}(x^t), x^t = z_p^t \quad \text{(Equation 6)}$$

$\gamma$: learning rate of neural network model
$z_p^t$: latent value (manufacturing parameter value) input to the neural network model at time t The method for setting of the semiconductor manufacturing parameter may further include an operation of calculating a PDP sensitivity for the PDP for respective manufacturing parameters.

The operation of calculating the PDP sensitivity may calculate the PDP sensitivity of each manufacturing parameter through a difference between a PDP value calculated when the minimum value of each manufacturing parameter is input and a PDP value calculated when the maximum value of each manufacturing parameter is input.

The operation of extracting the values of the manufacturing parameters that minimize the PDP may include an operation of selecting manufacturing parameters for which the PDP sensitivity is greater than or equal to a preset reference among the respective manufacturing parameters.

The method for setting of the semiconductor manufacturing parameter may further include an operation of calculating each of a power sensitivity to the power and a delay sensitivity to the delay for the respective manufacturing parameters.

The operation of calculating the power sensitivity may calculate the power sensitivity of each manufacturing parameter through a difference between a power value calculated when a minimum value of each manufacturing parameter is input and a power value calculated when a maximum value of each manufacturing parameter is input, and the operation of calculating the delay sensitivity may calculate the delay sensitivity of each manufacturing parameter through a difference between a delay value calculated when the minimum value of each manufacturing parameter is input and a delay value calculated when the maximum value of each manufacturing parameter is input.

The method for setting of the semiconductor manufacturing parameter may further include an operation of classifying the respective manufacturing parameters into a plurality of preset groups based on the power sensitivity and the delay sensitivity.

The operation of classifying the respective manufacturing parameters into the plurality of preset groups may classify manufacturing parameters insensitive to both the power and the delay into a first group, classify the manufacturing parameters sensitive only to the delay into a second group, classify the manufacturing parameters sensitive only to the power into a third group, classify manufacturing parameters sensitive to both the power and the delay into a fourth group, and classify manufacturing parameters that are sensitive to both the power and the delay but are sensitive in opposite directions from each other into a fifth group.

A computing device according to a disclosed embodiment includes one or more processors, a memory, and one or more programs, in which the one or more programs are stored in the memory and configured to be executed by the one or more processors, and the one or more programs includes an instruction for inputting manufacturing parameters for manufacturing a semiconductor into a neural network model, and an instruction for training the neural network model to predict at least one of power and delay of the semiconductor based on the input manufacturing parameters.

According to the disclosed embodiment, manufacturing parameters that can optimize performance of a semiconductor from an overall perspective while minimizing the time required may be detected by predicting power and delay, which are important factors that determine the performance of the semiconductor for respective manufacturing parameters using a neural network model and calculating power delay products (PDP) through the prediction.

In addition, by calculating the PDP sensitivity, delay sensitivity, and power sensitivity of each manufacturing parameter, it is possible to clarify the correlation of how each manufacturing parameter affects the PDP, delay, and power, and using this, it is possible to set the manufacturing parameters and their values for optimizing the PDP, delay, the power, etc.

BRIEF DESCRIPTION OF THE DRAWINGS

FIG. 3 is a diagram illustrating manufacturing parameters of the 32 nm node High-K Metal Gate (HKMG) transistor.

FIG. 5 is a table illustrating a state in which a PDP value for each repeat number is measured and an average and standard deviation of the measured PDP values are calculated in a disclosed embodiment.

FIG. 9 is a table illustrating PDP sensitivity (dy) of each manufacturing parameter in a descending order in an embodiment of the present disclosure.

FIG. 10 is a table illustrating a state in which respective manufacturing parameters are classified according to delay sensitivity and power sensitivity in an embodiment of the present disclosure.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies related to the present disclosure may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, the terms "transfer", "communication", "transmission", "reception" and other terms with similar meanings include not only direct transmission of a signal or information from one component to another component, but also transmission through another component. In particular, "transferring" or "transmitting" a signal or information to a component indicates the final destination of the signal or information and does not mean a direct destination. The same is true for "reception" of the signal or information. In addition, in this specification, when two or more data or information are "related", it means that when one data (or information) is acquired, at least a part of the other data (or information) can be acquired based thereon.

In addition, terms such as the first and second may be used to describe various components, but the components should not be limited by the terms. The above terms may be used for the purpose of distinguishing one component from another component. For example, without departing from the scope of the present disclosure, a first component may be referred to as a second component, and similarly, the second component may also be referred to as the first component.

Figure 1:
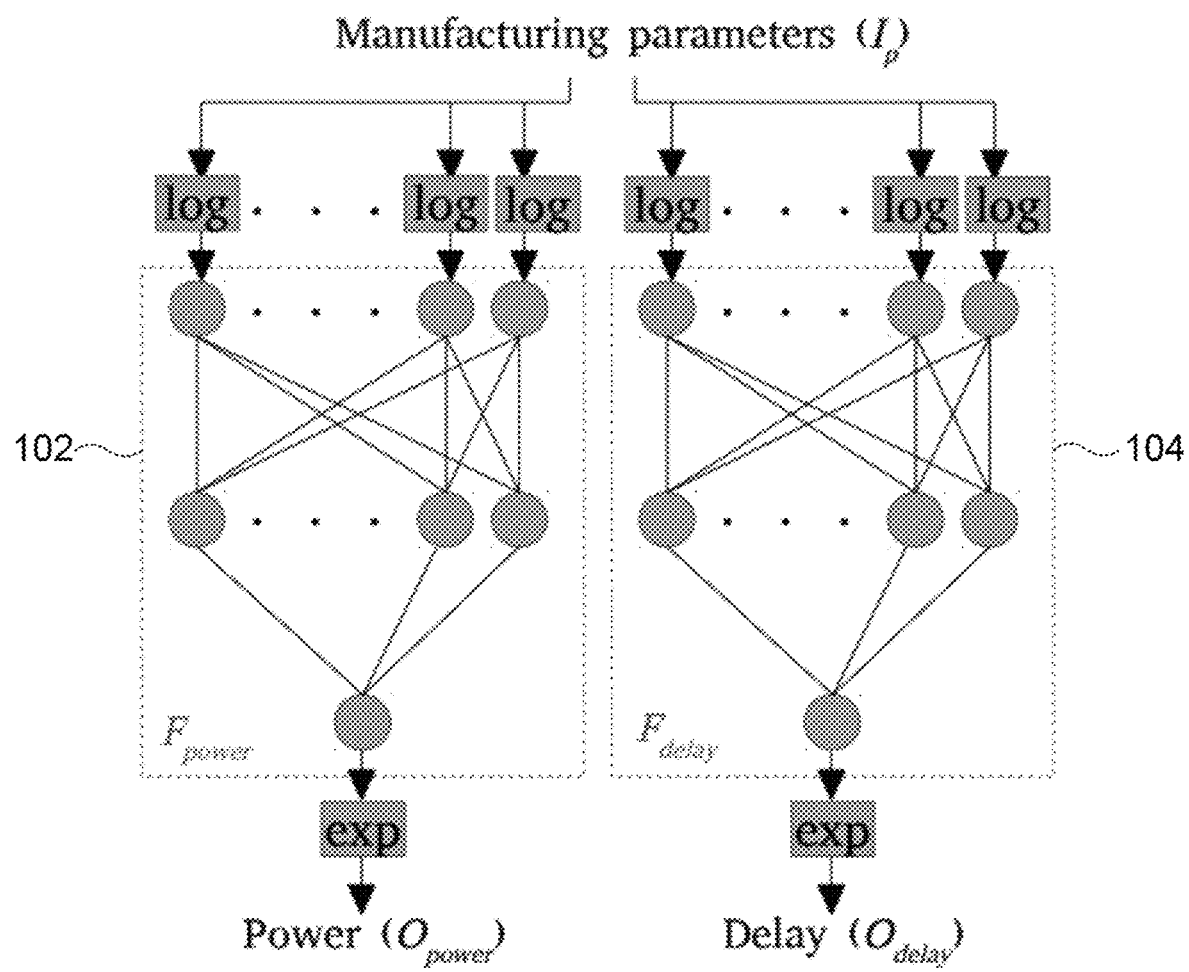
FIG. 1 is a diagram illustrating a neural network model of an apparatus for setting of a semiconductor manufacturing parameter according to an embodiment of the present disclosure.

FIG. 1 is a diagram illustrating a neural network model of an apparatus for setting a semiconductor manufacturing parameter according to an embodiment of the present disclosure.

Referring to FIG. 1, an apparatus for setting of a semiconductor manufacturing parameter 100 may optimize and set semiconductor manufacturing parameters through an artificial neural network. That is, the apparatus for setting of the semiconductor manufacturing parameter 100 may learn to calculate manufacturing parameters capable of optimizing semiconductor performance based on the artificial neural network. Hereinafter, for convenience of description, description will be made by taking a transistor as an example of the semiconductor. However, the present disclosure is not limited thereto, and of course, the present disclosure may be applied to other types of semiconductors other than transistors and semiconductors in which a plurality of transistors are connected.

The apparatus for setting of the semiconductor manufacturing parameter 100 may include a first neural network model 102 and a second neural network model 104. Transistor manufacturing parameters (hereinafter, may be referred to as a manufacturing parameters) may be respectively input to the first neural network model 102 and the second neural network model 104. The transistor manufacturing parameters are parameters used to manufacture transistors.

Figure 2:
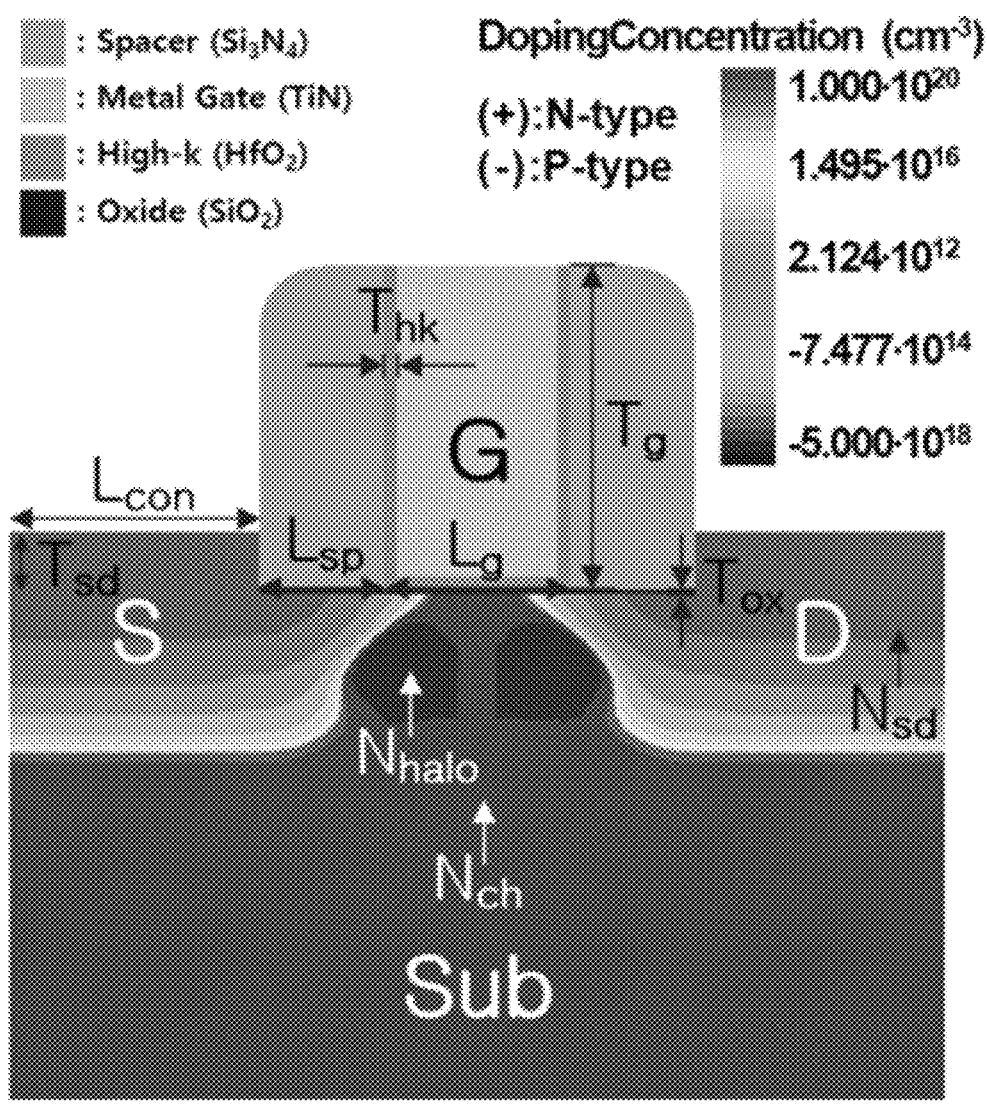
FIG. 2 is a diagram schematically illustrating a structure of a 32 nm node High-K Metal Gate (HKMG) transistor.

FIG. 2 is a diagram schematically illustrating a structure of a 32 nm node High-K Metal Gate (HKMG) transistor and FIG. 3 is a diagram illustrating manufacturing parameters of the 32 nm node High-K Metal Gate (HKMG) transistor.

Referring to FIGS. 2 and 3, the manufacturing parameters of the transistor may include a gate length $L_g$, a spacer length $L_{sp(s/d)}$, a contact length $L_{con(s/d)}$, an oxide thickness $T_{ox}$, a High-K thickness $T_{hk}$, a doping concentration $N_{ch}$, $N_{halo(s/d)}$, and $N_{sd(s/d)}$, a junction gradient $L_{haloj(s/d)}$, and $L_{sdj(s/d)}$, a gate stack height $T_g$, and an S/D epi height $T_{sd(s/d)}$.

In addition, the manufacturing parameters of the transistor may include all kinds of materials necessary for manufacturing the transistor of FIG. 2, physical and chemical property values of the materials, and setting values of equipment handling the materials.

Here, each manufacturing parameter may be input to the first neural network model 102 and the second neural network model 104 in a range of the minimum value Min to the maximum value Max illustrated in FIG. 3 to be learned.

Here, the structure and manufacturing parameters have been described by taking that the transistor is a 32 nm node High-K Metal Gate (HKMG) transistor as an embodiment, but the transistor is not limited thereto, and a transistor using various types of structures and materials other than that may be applied. In this case, the manufacturing parameters and numerical values of the manufacturing parameters (e.g., the minimum value Min and the maximum value Max) may vary depending on the transistor.

In an exemplary embodiment, the manufacturing parameters for which log is taken may be input to the first neural network model 102 and the second neural network model 104. That is, log-scaled manufacturing parameters may be respectively input to the first neural network model 102 and the second neural network model 104.

The first neural network model 102 may be trained to receive each log-scaled manufacturing parameter and predict power of the transistor from each log-scaled manufacturing parameter (i.e., predict power consumption of the transistor when the transistor is manufactured according to the input manufacturing parameters). The first neural network model 102 may be trained to output log-scaled power $\log(O_{power})$ of the transistor from input log-scaled manufacturing parameters. The first neural network model 102 may be represented by Equation 1 below.

$$\log(O_{power}) = F_{power}(\log(I_p)) \quad \text{(Equation 1)}$$

Here, $F_{power}$ may indicate a neural network constituting the first neural network model 102, and $I_p$ may indicate a manufacturing parameter.

The second neural network model 104 may be trained to receive each log-scaled manufacturing parameter and predict a delay of the transistor from each log-scaled manufacturing parameter. Here, the delay may mean a delay between the input and the output of the transistor, but is not limited thereto, the delay may mean an operating frequency of the transistor (the delay has a time dimension, and the reciprocal of time is the frequency). The second neural network model 104 may be trained to output a log-scaled delay log(Odelay) of the transistor from input log-scaled manufacturing parameters. The second neural network model 104 may be represented by Equation 2 below.

$$\log(O_{delay}) = F_{delay}(\log(I_p)) \quad \text{(Equation 2)}$$

Here, $F_{delay}$ may indicate a neural network constituting the second neural network model 104.

In the first neural network model 102 and the second neural network model 104, a log scale was applied to both input values (i.e., manufacturing parameters) and output values (i.e., power and delay), and this is to prevent neural network learning from failing due to a large scale difference between the input value and the output value. Here, it has been described that the input values are normalized by taking the log of the manufacturing parameters, but is not limited thereto, and the input values may be normalized through various methods other than that.

The first neural network model 102 may be trained such that a difference between a power value (predicted power value) output from the first neural network model 102 and a preset target power value is minimized. The second neural network model 104 may be trained such that a difference between a delay (predicted delay) output from the second neural network model 104 and a preset target delay is minimized. This can be represented by Equation 3.

$$L_y = \frac{1}{N} \sum_i^N \|\log(O_y^i) - \log(D_y^i)\|^2, \; y = \text{power or delay} \quad \text{(Equation 3)}$$

Here, $L_y$ may represent a loss function of the first neural network model 102 (when y=power) and the second neural network model 104 (when y=delay). N may represent the number of training data of the first neural network model 102 and the second neural network model 104, and i may represent i-th training data.

$\log(O_y^i)$ may represent the output value (predicted value) of the first neural network model 102 (when y=power) and the second neural network model 104 (when y=delay) for the i-th training data, and $\log(D_y^i)$ may represent the target value of the first neural network model 102 (when y=power) or the second neural network model 104 (when y=delay) for the i-th training data.

According to Equation 3, minimizing the loss function $L_y$ on the log scale may be minimizing a ratio (that is, $$\left|\log\left(\frac{O_y^i}{D_y^i}\right)\right|$$

of the output value to the target value on the log scale. In this way, by minimizing the ratio of the output value and the target value on the log scale rather than simply minimizing the difference between the output value and the target value, an error can be maintained at a certain level regardless of whether the target value is large or small.

Here, it has been described that power is predicted through the first neural network model 102 and delay is predicted through the second neural network model 104, but is not limited thereto, and it can be configured to predict both the power and the delay through a single neural network model.

Meanwhile, power delay products (PDP) are a method commonly used to measure performance of the transistor, and may be expressed as a value obtained by multiplying power by delay. Here, it can be indicated that the smaller the PDP, the better the performance of the transistor. That is, it can be indicated that the lower the power and the shorter the delay, the better the performance of the transistor.

Since the apparatus for setting of a semiconductor manufacturing parameter 100 outputs log-scaled power and delay, the log-scaled PDP can be expressed as the sum of the two outputs as in Equation 4. Here, $x = \log(I_p)$.

$$\text{Log}(PDP(x)) = \log(O_{power}(x) \cdot O_{delay}(x)) = \log(O_{power}(x)) + \log(O_{delay}(x)) \quad \text{(Equation 4)}$$

The apparatus for setting of a semiconductor manufacturing parameter 100 may detect values of optimal manufacturing parameters capable of minimizing the log-scaled PDP. In the disclosed embodiment, a gradient descent method may be applied to the first neural network model 102 and the second neural network model 104 to detect values of manufacturing parameters that minimize the log-scaled PDP.

Figure 4:
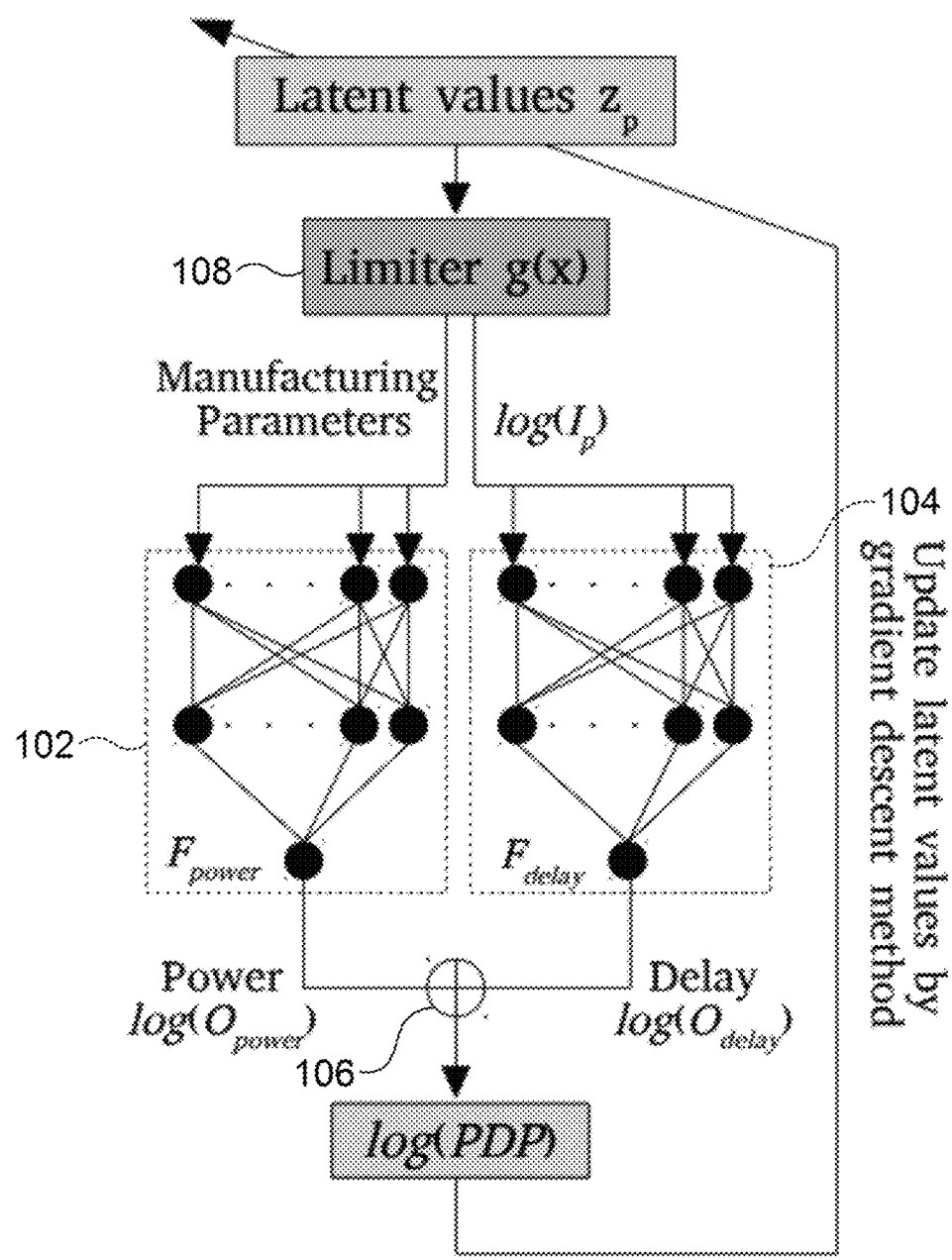
FIG. 4 is a diagram schematically illustrating a state in which a gradient descent method is applied to a first neural network model and a second neural network model in a disclosed embodiment.

FIG. 4 is a diagram schematically illustrating a state in which the gradient descent method is applied to the first neural network model 102 and the second neural network model 104 in a disclosed embodiment.

Referring to FIG. 4, the apparatus for setting of a semiconductor manufacturing parameter 100 may further include a summing unit 106 for outputting a log-scaled PDP by adding the log-scaled power $\log(O_{power})$ output from the first neural network model 102 and the log-scaled delay log($O_{delay}$) output from the second neural network model 104

When the gradient descent method is described with reference to FIG. 4, the apparatus for setting of a semiconductor manufacturing parameter 100 may set a randomly selected initial manufacturing parameter $I_p^0$ and learning rate γ.

Next, as represented by Equation 5, the apparatus for setting of a semiconductor manufacturing parameter 100 may calculate a slope G(x) of the log-scaled PDP with respect to the manufacturing parameter with the initial manufacturing parameter $I_p^0$ (first step). Here, $x=\log(I_p^0)$.

$$G(x) = \frac{d(\log(PDP))}{dx} = \frac{dF_{power}}{dx} + \frac{dF_{delay}}{dx}(x) \quad \text{(Equation 5)}$$

Next, as represented by Equation 6, the apparatus for setting of a semiconductor manufacturing parameter 100 may update the manufacturing parameter (here the initial manufacturing parameter) to move the log-scaled slope G(x) in a negative direction using the learning rate γ at the time stamp t=0 (second step).

$$x^{t+1} = x^t - \gamma \cdot G(x^t), x^t = \log(I_p^t) \quad \text{(Equation 6)}$$

Next, the apparatus for setting of a semiconductor manufacturing parameter 100 may repeatedly perform the first step and the second step while increasing the time t. That is, the apparatus for setting of a semiconductor manufacturing parameter 100 may calculate the slope of the log-scaled PDP through Equation 5 in a state where time t is increased by 1, update the manufacturing parameter to move the slope of the log-scaled in the negative direction at t=1 through Equation 6, and repeatedly perform this process.

In this case, the apparatus for setting of a semiconductor manufacturing parameter 100 may repeatedly perform the first step and the second step until a preset interruption condition is satisfied. Here, the preset interruption condition may be a case in which the log-scaled PDP output from the summing unit 106 is less than or equal to a preset target value (first condition). In addition, the preset interruption condition may be a case in which the slope G(x) on the log-scaled PDP is less than or equal to a preset threshold slope (second condition). In addition, the preset interruption condition may be a case in which the amount of change in the manufacturing parameter (i.e., the amount by which the manufacturing parameter has changed compared to the previous time) is less than or equal to a preset threshold change amount (third condition).

The apparatus for setting of a semiconductor manufacturing parameter 100 may repeatedly perform the first step and the second step until any one of the first condition, the second condition, and the third condition is satisfied. When the preset interruption condition is satisfied, the apparatus for setting of a semiconductor manufacturing parameter 100 may detect the value of the corresponding manufacturing parameter as an optimal manufacturing parameter value that minimizes the log-scaled PDP.

Meanwhile, it cannot be guaranteed that the values of the optimal manufacturing parameters detected through the gradient descent method are within an actual controllable range in the semiconductor manufacturing process. For example, the optimal manufacturing parameter detected through gradient descent method may be outside a range (that is, a range learned by the first neural network model 102 and the second neural network model 104) of the minimum value to the maximum value of the manufacturing parameter illustrated in FIG. 3.

To this end, the apparatus for setting of a semiconductor manufacturing parameter 100 may further include a limiter 108 for ensuring that the optimal manufacturing parameters do not deviate from the range (i.e., the minimum value to the maximum value) of the manufacturing parameters learned in the first neural network model 102 and the second neural network model 104.

The limiter 108 may limit the range of input values of the manufacturing parameters so that the manufacturing parameters are input to the first neural network model 102 and the second neural network model 104 within a pre-learned range (i.e., the minimum value to the maximum value). In this time, the limiter 108 may receive a latent value having an arbitrary value (i.e., −∞~+∞) without limitation, and may output, using a limiter function, the latent value to be within the pre-learned range of the manufacturing parameters. This can be expressed through Equation 7 below.

$$g(z_p) = \text{sig}(z_p) \cdot (\log(I_p^{max}) - \log(I_p^{min})) + \log(I_p^{min}) \quad \text{(Equation 7)}$$

$g(z_p)$: limiter function
$z_p$: latent value
$I_p^{min}$: the minimum value within the controllable range of the manufacturing parameter
$I_p^{max}$: the maximum value within the controllable range of the manufacturing parameter
sig: sigmoid function, $$\text{sig}(z_p) = \frac{1}{1 + e^{-z_p}}$$

Here, the output range of $g(z_p)$, which is the limiter function, is from 0 to 1, and thus when the latent value $z_p$ goes to +∞, $g(z_p) = \log(I_p^{max})$, and when the latent value $z_p$ goes to −∞, $g(z_p) = \log(I_p^{min})$. Therefore, the range of the value output from the limiter function belongs to the controllable range (minimum value to maximum value) of the manufacturing parameter.

In an exemplary embodiment, the gradient descent method using the limiter function can be expressed through Equations 7 and 8 below. Here, for numerical efficiency, a method for obtaining a numerical gradient (($\hat{G}(x)$) in Equation 7) rather than obtaining a complex analytic gradient (G(x) in Equation 5) of a neural network function was used.

$$\hat{G}(x) = \frac{\log(PDP \cdot g(x + \frac{\tau}{2})) - \log(PDP \cdot g(x - \frac{\tau}{2}))}{\tau} \quad \text{(Equation 7)}$$

$$x^{t+1} = x^t - \gamma \cdot \hat{G}(x^t), x^t = z_p^t \quad \text{(Equation 8)}$$

Here, τ≈0 (i.e., τ is a number close to 0). That is, in Equation 7, the numerical slope $\hat{G}(x)$ of the log-scaled PDP for the manufacturing parameter can be calculated by averaging the increment for $$x + \frac{\tau}{2}$$

and the decrement for $$x - \frac{\tau}{2}$$

for the manufacturing parameter input x.

As such, by performing, through the limiter unit 108, the gradient descent method in a state where the range of input values of the manufacturing parameters is limited so that the manufacturing parameters are input to the first neural network model 102 and the second neural network model 104 within the pre-learned range (i.e., the minimum value to the maximum value), it is possible to extract the optimal manufacturing parameters that can minimize the power delay products (PDP) of the corresponding transistor.

The apparatus for setting of a semiconductor manufacturing parameter 100 may repeatedly perform an optimization process to obtain a stable optimal result. In this case, as illustrated in FIG. 5, the apparatus for setting of a semiconductor manufacturing parameter 100 may measure the PDP value for each repetition number to find the optimal repetition number, and calculate the average and standard deviation of the measured PDP values.

Referring to FIG. 5, when the repetition number is 10 or more and the standard deviation is reduced to $0.0002 \times 10^{-18}$, it can be confirmed that the PDP value is saturated at about $0.3066 \times 10^{-15}$. It can be seen that, when the repetition number is 20, the delay and power converge to the optimally predicted values of $0.1685 \times 10^{-11}$ and $0.1819 \times 10^{-3}$, respectively, and also have very small standard deviations of $0.0005 \times 10^{-13}$ and $0.0006 \times 10^{-5}$, respectively. The apparatus for setting of a semiconductor manufacturing parameter 100 may determine the optimal repetition number using these results.

Meanwhile, the apparatus for setting of a semiconductor manufacturing parameter 100 may analyze to what extent each manufacturing parameter affects the PDP value (including power and delay as well) of the corresponding transistor.

Figure 6:
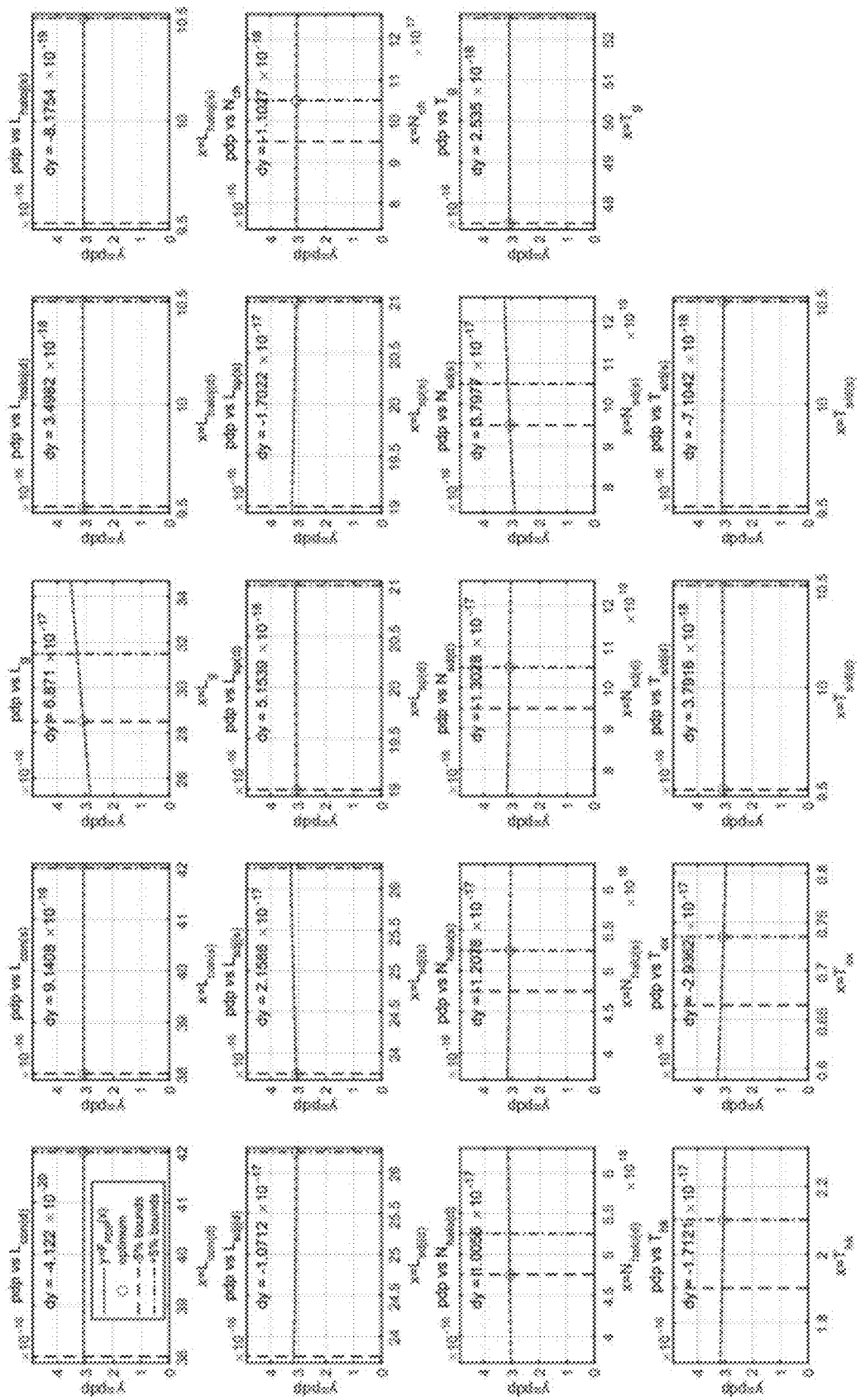
FIG. 6 is a graph illustrating a change in the PDP value according to a change in each manufacturing parameter in an embodiment of the present disclosure.
Figure 7:
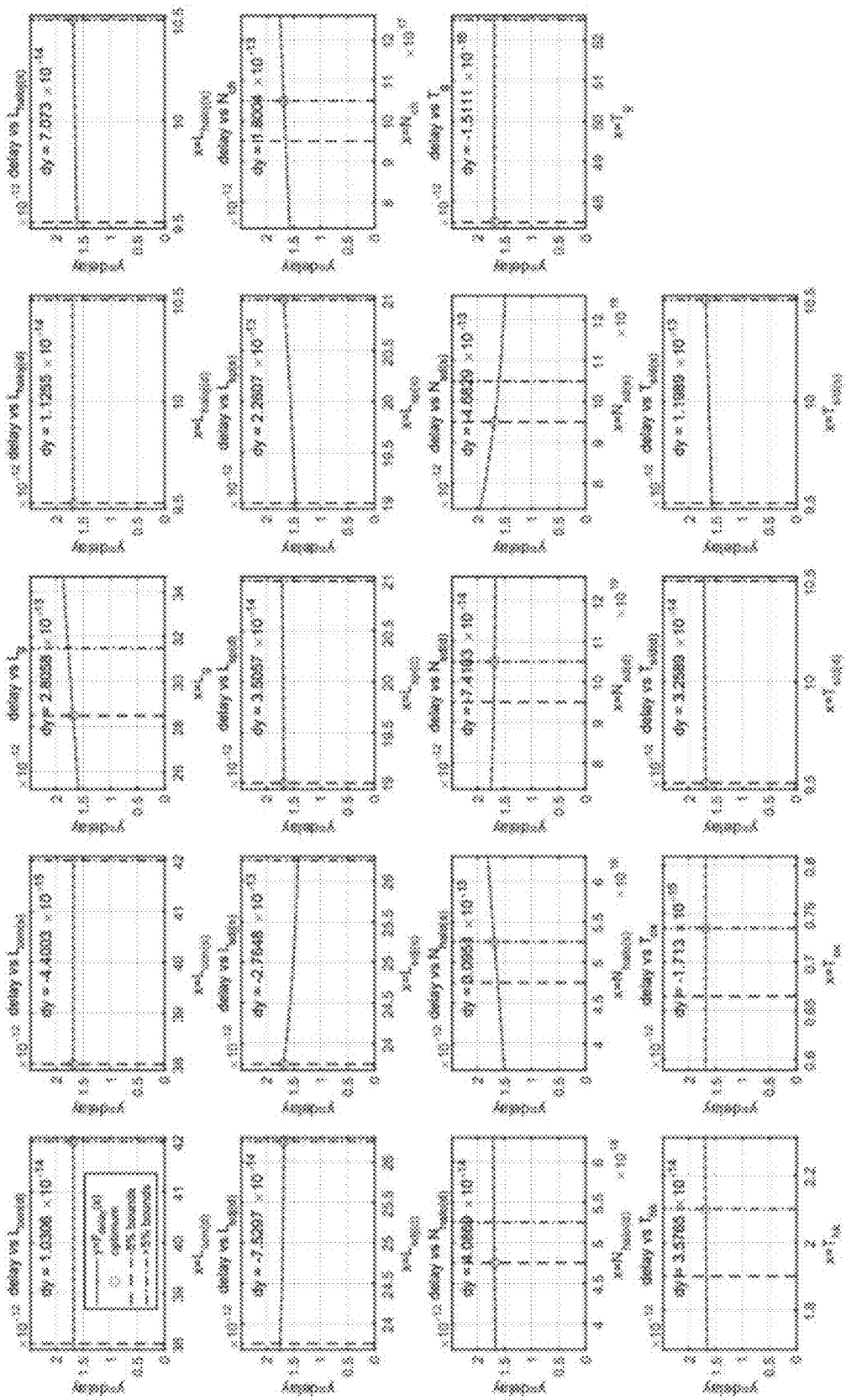
FIG. 7 is a graph illustrating a change in delay according to the change in each manufacturing parameter in an embodiment of the present disclosure.
Figure 8:
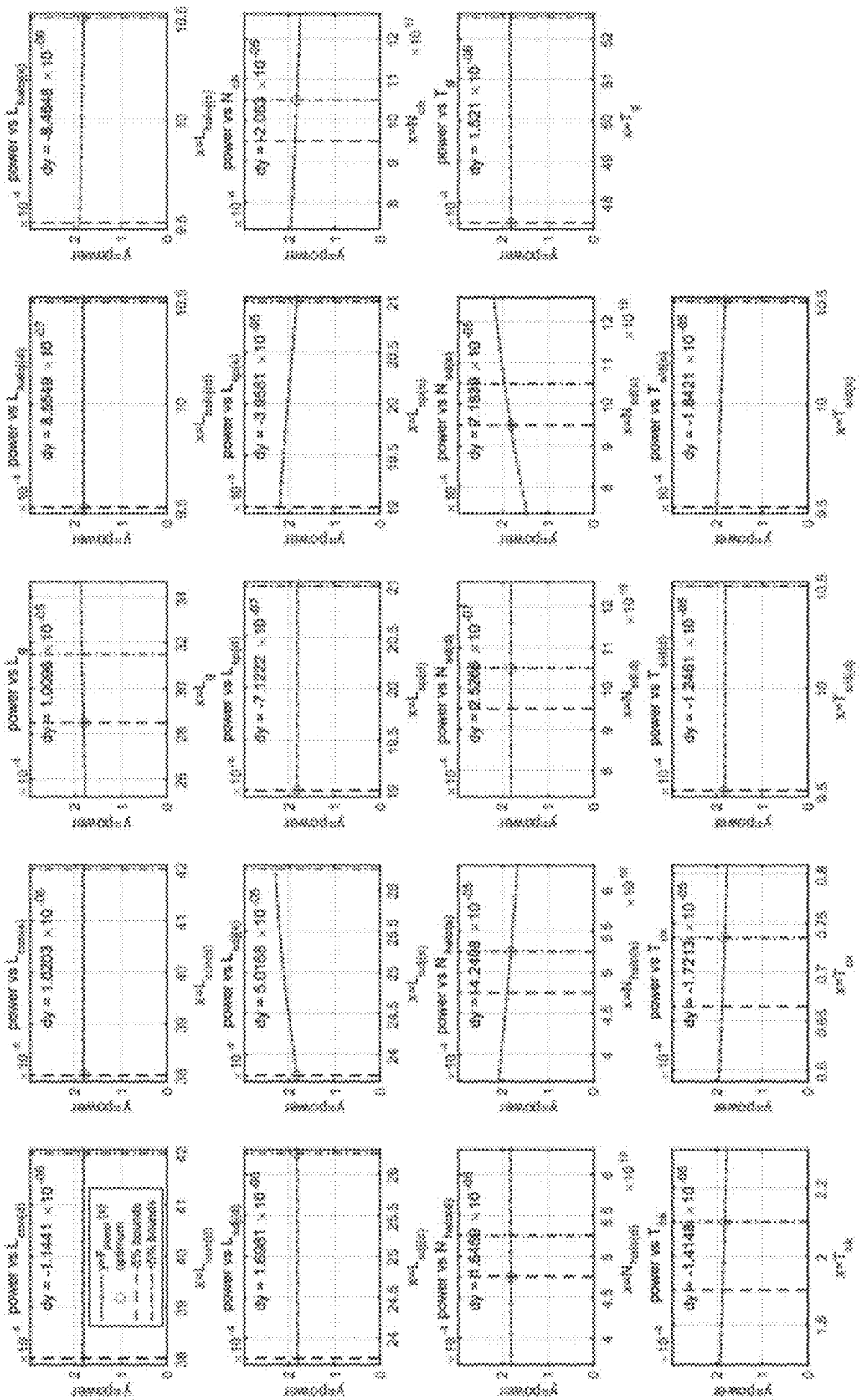
FIG. 8 is a graph illustrating a change in power according to the change in each manufacturing parameter in an embodiment of the present disclosure.

FIG. 6 is a graph illustrating a change in the PDP value according to the change in each manufacturing parameter in an embodiment of the present disclosure, FIG. 7 is a graph illustrating a change in delay according to a change in each manufacturing parameter in an embodiment of the present disclosure, and FIG. 8 is a graph illustrating a change in power according to a change in each manufacturing parameter in an embodiment of the present disclosure. Here, changes in the PDP value, delay, and power according to the change from the minimum value to the maximum value of each manufacturing parameter illustrated in FIG. 3 are illustrated.

The apparatus for setting of a semiconductor manufacturing parameter 100 may calculate the PDP sensitivity for each manufacturing parameter through a difference between the PDP value when the minimum value of the corresponding manufacturing parameter is input and the PDP value when the maximum value of the corresponding manufacturing parameter is input. Here, the PDP sensitivity may indicate how much the manufacturing parameter affects a performance index (i.e., PDP). FIG. 9 is a table illustrating PDP sensitivity (dy) of each manufacturing parameter in a descending order in an embodiment of the present disclosure.

The apparatus for setting of a semiconductor manufacturing parameter 100 may select a manufacturing parameter for obtaining an optimal PDP through the PDP sensitivity of each manufacturing parameter. That is, referring to FIG. 9, it can be seen that among the manufacturing parameters, $L_{con(d)}$, $L_{haloj(s)}$, etc. have very low PDP sensitivity. This means that changes in $L_{con(d)}$ and $L_{haloj(s)}$ have little influence on the PDP values. Accordingly, the apparatus for setting of a semiconductor manufacturing parameter 100 may select manufacturing parameters whose PDP sensitivity is greater than or equal to a preset reference among the respective manufacturing parameters and use the manufacturing parameters to obtain the optimal PDP.

In addition, the apparatus for setting of a semiconductor manufacturing parameter 100 may calculate each of the sensitivities power and delay for each of the manufacturing parameters. That is, the apparatus for setting of a semiconductor manufacturing parameter 100 may calculate, for each manufacturing parameter, the power sensitivity through a difference between a power value when the minimum value of the corresponding manufacturing parameter is input and a power value when the maximum value of the corresponding manufacturing parameter is input. The apparatus for setting of a semiconductor manufacturing parameter 100 may calculate, for each manufacturing parameter, the delay sensitivity through a difference between the delay when the minimum value of the corresponding manufacturing parameter is input and the delay when the maximum value of the corresponding manufacturing parameter is input.

The apparatus for setting of a semiconductor manufacturing parameter 100 may classify the manufacturing parameters into a plurality of preset groups based on power sensitivity and delay sensitivity of the respective manufacturing parameters. FIG. 10 is a table illustrating a state in which the respective manufacturing parameters are classified according to delay sensitivity and power sensitivity in an embodiment of the present disclosure.

Specifically, the apparatus for setting of a semiconductor manufacturing parameter 100 may classify the respective manufacturing parameters into a first group insensitive to both power and delay, a second group sensitive only to delay, a third group sensitive only to power, a fourth group sensitive to both power and delay, and a fifth group sensitive to both power and delay but in the opposite direction, according to the power sensitivity and delay sensitivity of the respective manufacturing parameters. Here, when the manufacturing parameters are represented by (delay sensitivity, power sensitivity), the first group can be represented by (0, 0), the second group can be represented by (±, 0), the third group can be represented by (0, ±), and the fourth group can be represented by (±, ±), the fifth group can be represented by (±, ∓).

In FIG. 9, it can be seen that $L_{cond(s/d)}$, $L_{haloj(d)}$, and $T_g$ having very low PDP sensitivity belong to the first group (0,0) which is insensitive to both, and it can be seen that $L_{cond(s/d)}$, $L_{haloj(d)}$, and $T_g$ have no influence on the optimization process at all. It can be seen that $N_{ch}$ and $L_{haloj(s)}$ having low PDP sensitivity belong to the fifth group (±, ∓), which is sensitive to both but is sensitive in the opposite direction, and it can be found that these manufacturing parameters are useful for controlling the delay and power of the transistor without changing the PDP.

In addition, it can be seen that the manufacturing parameter belonging to the second group (±, 0) such as $L_{sdj(d)}$ or the third group (0, ±) such as $T_{ox}$ are effective for independently controlling the delay or power of the transistor.

In this way, by calculating the PDP sensitivity, delay sensitivity, and power sensitivity of each manufacturing parameter, it is possible to clarify the correlation of how each manufacturing parameter affects the PDP, delay, and power, and using this, it is possible to set manufacturing parameters and their values for optimizing the PDP, delay, power, etc.

Figure 11:
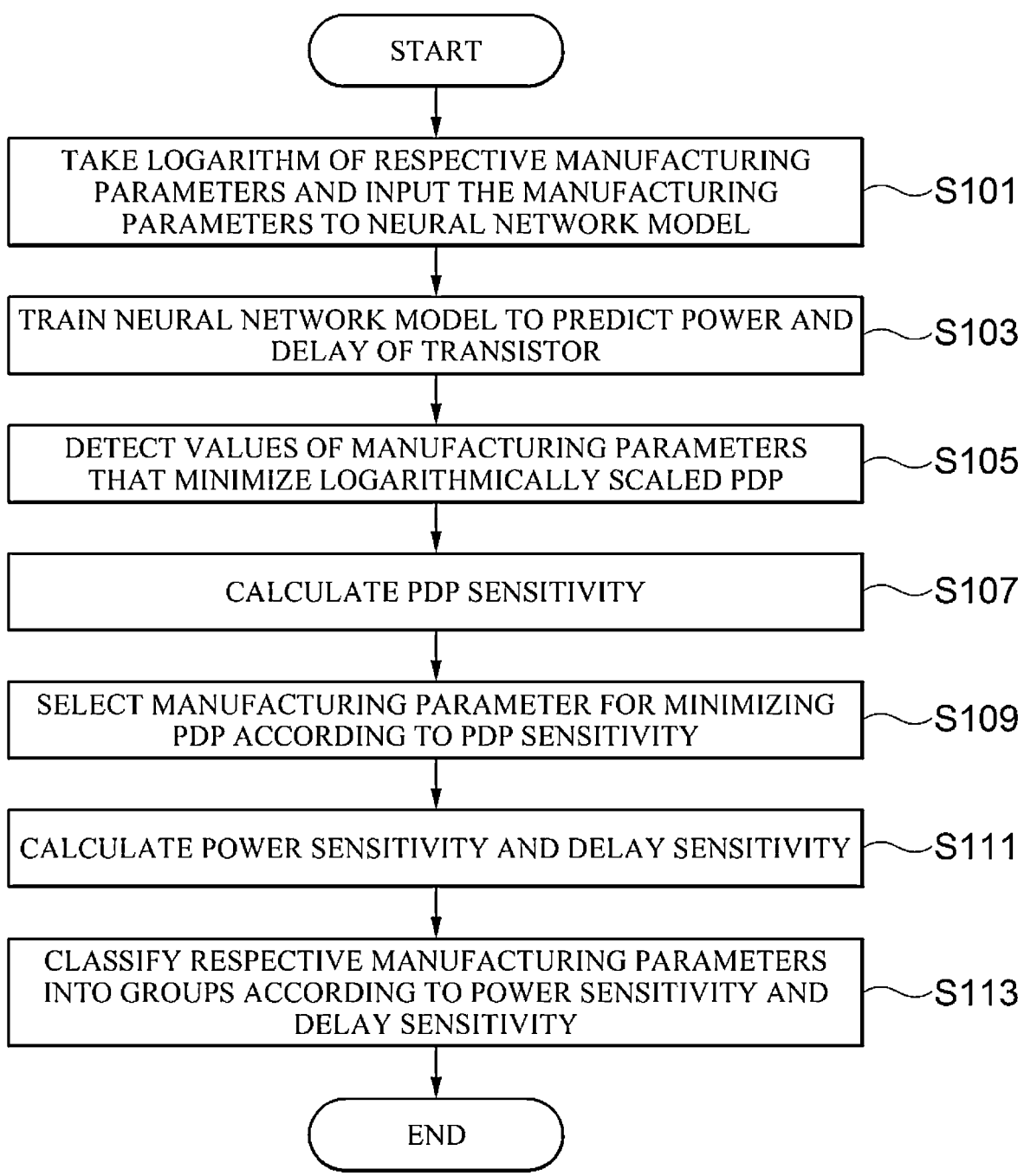
FIG. 11 is a flowchart illustrating a method for setting of a semiconductor manufacturing parameter according to an embodiment of the present disclosure.

FIG. 11 is a flowchart illustrating a method for setting of a semiconductor manufacturing parameter according to an embodiment of the present disclosure. In the illustrated flowchart, the method has been described by dividing the method into a plurality of steps, but at least some of the steps may be performed in a different order, are performed in combination with other steps, are omitted, are performed by being divided into separate steps, or performed by being added with one or more steps.

Referring to FIG. 11, the apparatus for setting of a semiconductor manufacturing parameter 100 takes a log of the respective manufacturing parameters of the transistor and inputs the respective manufacturing parameters to the first neural network model 102 and the second neural network model 104 (S101).

Next, the apparatus for setting of a semiconductor manufacturing parameter 100 trains the first neural network model 102 and the second neural network model 104 to predict the power and delay of the transistor from each log-scaled manufacturing parameter (S103). Here, the apparatus for setting of a semiconductor manufacturing parameter 100 may calculate power delay products (PDP) of the transistor based on the predicted power and delay.

Next, the apparatus for setting of a semiconductor manufacturing parameter 100 applies the gradient descent method to the first neural network model 102 and the second neural network model 104 to detect values of manufacturing parameters that minimize log-scaled PDP (S105).

Here, the apparatus for setting of a semiconductor manufacturing parameter 100 may use a limiter function to limit a range of input values of the manufacturing parameters so that the manufacturing parameters are input to the first neural network model 102 and the second neural network model 104 within the range of the pre-learned minimum value to the maximum value.

Next, the apparatus for setting of a semiconductor manufacturing parameter 100 calculates the PDP sensitivity for each manufacturing parameter (S107).

Next, the apparatus for setting of a semiconductor manufacturing parameter 100 selects a manufacturing parameter that minimizes the PDP according to the PDP sensitivity among the respective manufacturing parameters (S109). The apparatus for setting of a semiconductor manufacturing parameter 100 may select manufacturing parameters for which PDP sensitivity is greater than or equal to a preset reference among manufacturing parameters as the manufacturing parameters for minimizing PDP.

Next, the apparatus for setting of a semiconductor manufacturing parameter 100 calculates power sensitivity and delay sensitivity for each manufacturing parameter (S111).

Next, the apparatus for setting of a semiconductor manufacturing parameter 100 classifies the respective manufacturing parameters into a plurality of preset groups according to the power sensitivity and delay sensitivity (S113). Through this, it is possible to easily ascertain the correlation of each manufacturing parameter with respect to the power and delay of the transistor.

Figure 12:
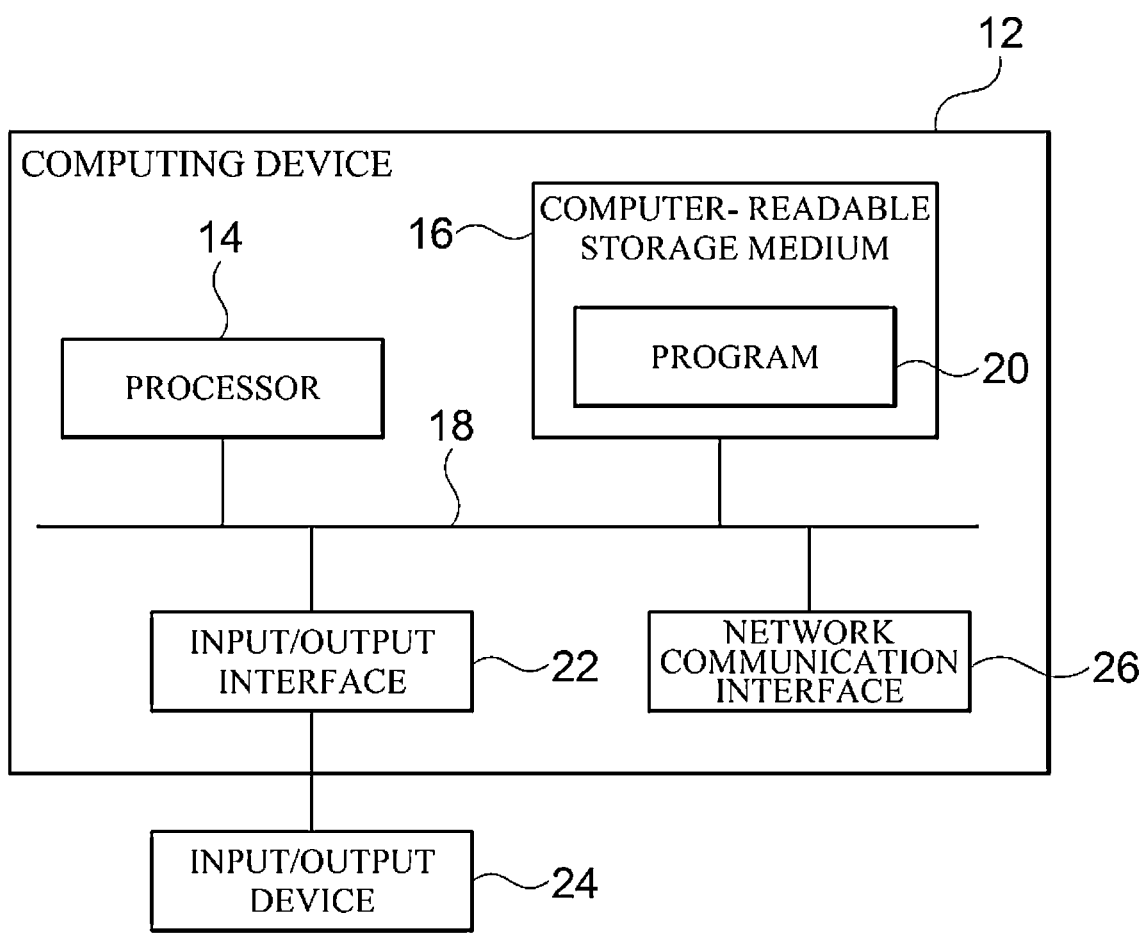
FIG. 12 is a block diagram illustratively describing a computing environment including a computing device suitable for use in exemplary embodiments.

FIG. 12 is a block diagram illustratively describing a computing environment including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the apparatus for setting of a semiconductor manufacturing parameter 100.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing device 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although representative embodiments of the present disclosure have been described in detail, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A method for setting of a semiconductor manufacturing parameter performed in a computing device comprising one or more processors and a memory for storing one or more programs executed by the one or more processors, the method comprising:

an operation of inputting manufacturing parameters for manufacturing a semiconductor to a neural network model; and an operation of training the neural network model to predict at least one of power and delay of the semiconductor based on the input manufacturing parameters, wherein the operation of training the neural network model trains the neural network model to predict at least one of the power and delay of the semiconductor within a range of a preset minimum value to maximum value for each of the manufacturing parameters, wherein the neural network model comprises:
- a first neural network model configured to receive each manufacturing parameter and is trained to predict the power of the semiconductor from each received manufacturing parameter; and
- a second neural network model configured to receive each manufacturing parameter and is trained to predict the delay of the semiconductor from each received manufacturing parameter, wherein the operation of inputting into the neural network model inputs a value obtained by taking a log of the manufacturing parameters to the neural network model; and loss functions of the first neural network model and the second neural network model is represented by Equation 1 below:

$$L_y = \frac{1}{N}\sum_{i}^{N} \|\log(O_y^i) - \log(D_y^i)\|^2, \; y = \text{power or delay} \quad [\text{Equation 1}]$$

where $L_y$: loss function of the first neural network model when y=power, loss function of the second neural network model when y=delay;

N: the number of training data of the first neural network model and the second neural network model;

i: i-th training data;

$\log(O_y^i)$: predicted value of the first neural network model (when y=power) and the second neural network model (when y=delay) for the i-th training data; and $\log(D_y^i)$: target value of the first neural network model (when y=power) and the second neural network model (when y=delay) for the i-th training data.

2. The method of claim 1, wherein the operation of inputting into the neural network model inputs a value obtained by taking a log of the manufacturing parameters to the neural network model.

3. The method of claim 1, wherein the neural network model is trained to predict each of the power and the delay of the semiconductor from each inputted manufacturing parameter; and the method for setting of the semiconductor manufacturing parameter further comprises an operation of calculating power delay products (PDP) based on the power and the delay predicted by the neural network model.

4. The method of claim 3, wherein the method for setting of the semiconductor manufacturing parameter further comprises an operation of extracting values of manufacturing parameters that minimize the PDP by using the trained neural network model.

5. The method of claim 4, wherein the operation of extracting the values of the manufacturing parameters that minimize the PDP extracts values of the manufacturing parameters that minimize the PDP by applying a gradient descent method to the trained neural network model.

6. The method of claim 5, wherein the operation of extracting the values of the manufacturing parameters that minimize the PDP by applying the gradient descent method comprises:

an operation of setting an initial value of each manufacturing parameter and a learning rate of the neural network model;

an operation of calculating a slope of the PDP with respect to the initial value of the manufacturing parameter and updating the manufacturing parameter for moving the slope of the PDP in a negative direction using the learning rate; and an operation of repeating the operation of updating until a preset interruption condition is satisfied.

7. The method of claim 6, wherein the operation of inputting to the neural network model inputs the value obtained by taking a log of the manufacturing parameters to the neural network model; and a slope G(x) of the PDP is calculated through Equation 2 below, and the update of the manufacturing parameter is performed through Equation 3 below:

$$G(x) = \frac{d(\log(PDP))}{dx} \quad [\text{Equation 2}]$$

$$x^{t+1} = x^t - \gamma \cdot G(x^t), \; x^t = \log(I_p^t) \quad [\text{Equation 3}]$$

where γ: learning rate of neural network model;

$I_p^t$: manufacturing parameter value input to neural network model at time t; and $x^t$: log-scaled manufacturing parameter value input to neural network model at time.

8. The method of claim 6, wherein the preset interruption condition includes one or more of a first condition in which the calculated PDP is less than or equal to a preset target value, a second condition in which the slope of the PDP is less than or equal to a preset threshold slope, and a third condition in which an updated amount of change of the manufacturing parameter is equal to or less than a preset threshold change amount.

9. The method of claim 6, wherein the operation of extracting the values of the manufacturing parameters that minimize the PDP by applying the gradient descent method further comprises:

an operation of limiting a range of input values of the manufacturing parameters so that the manufacturing parameters are input to the neural network model within a range of a pre-learned minimum value to maximum value.

10. The method of claim 9, wherein the operation of limiting the range of input values of the manufacturing parameters further comprises:

an operation of receiving an input of a latent value having an unrestricted arbitrary value; and an operation of outputting the input latent value to the neural network model by allowing the input latent value to be within the range of the pre-learned minimum value to maximum value by using a limiter function.

11. The method of claim 10, wherein the operation of inputting into the neural network model inputs a value obtained by taking a log of the manufacturing parameters to the neural network model; and the operation of allowing the latent value to be within the range of the pre-learned minimum value to maximum value is implemented through Equation 4 below, $$g(z_p) = \text{sig}(z_p) \cdot (\log(I_p^{max}) - \log(I_p^{min})) + \log(I_p^{min}) \quad \text{(Equation 4)}$$

where $g(z_p)$: limiter function;
$z_p$: latent value;
$I_p^{min}$: pre-learned minimum value of manufacturing parameter;
$I_p^{max}$: pre-learned maximum value of manufacturing parameter; and
sig: sigmoid function, $$\text{sig}(z_p) = \frac{1}{1 + e^{-z_p}}.$$

12. The method of claim 11, wherein the slope $\hat{G}(x)$ of the PDP is calculated through Equation 5 below, and the update of the manufacturing parameter is performed through Equation 6 below:

$$\hat{G}(x) = \frac{\log(PDP \cdot g(x + \frac{\tau}{2})) - \log(PDP \cdot g(x - \frac{\tau}{2}))}{\tau}, \tau \approx 0 \quad \text{[Equation 5]}$$

$$x^{t+1} = x^t - \gamma \cdot \hat{G}(x^t), x^t = z_p^t \quad \text{[Equation 6]}$$

where $\gamma$: learning rate of neural network model; and
$z_p^t$: latent value (manufacturing parameter value) input to the neural network model at time t.

13. The method of claim 4, wherein the method for setting of the semiconductor manufacturing parameter further comprises an operation of calculating a PDP sensitivity for the PDP for each manufacturing parameter.

14. The method of claim 13, wherein the operation of calculating the PDP sensitivity calculates the PDP sensitivity of each manufacturing parameter through a difference between a PDP value calculated when the minimum value of each manufacturing parameter is input and a PDP value calculated when the maximum value of each manufacturing parameter is input.

15. The method of claim 13, wherein the operation of extracting the values of the manufacturing parameters that minimize the PDP includes an operation of selecting manufacturing parameters for which the PDP sensitivity is greater than or equal to a preset reference among the respective manufacturing parameters.

16. The method of claim 4, wherein the method for setting of the semiconductor manufacturing parameter further comprises an operation of calculating each of a power sensitivity to the power and a delay sensitivity to the delay for the respective manufacturing parameters.

17. The method of claim 16, wherein the operation of calculating the power sensitivity calculates the power sensitivity of each manufacturing parameter through a difference between a power value calculated when a minimum value of each manufacturing parameter is input and a power value calculated when a maximum value of each manufacturing parameter is input; and
the operation of calculating the delay sensitivity calculates the delay sensitivity of each manufacturing parameter through a difference between a delay value calculated when the minimum value of each manufacturing parameter is input and a delay value calculated when the maximum value of each manufacturing parameter is input.

18. The method of claim 16, wherein the method for setting of the semiconductor manufacturing parameter further comprises an operation of classifying the respective manufacturing parameters into a plurality of preset groups based on the power sensitivity and the delay sensitivity.

19. The method of claim 18, wherein the operation of classifying the respective manufacturing parameters into the plurality of preset groups classifies manufacturing parameters insensitive to both the power and the delay into a first group, classifies the manufacturing parameters sensitive only to the delay into a second group, classifies the manufacturing parameters sensitive only to the power into a third group, classifies manufacturing parameters sensitive to both the power and the delay into a fourth group, and classifies manufacturing parameters that are sensitive to both the power and the delay but are sensitive in opposite directions from each other into a fifth group.

20. A computing device comprising:
one or more processors;
a memory; and
one or more programs,
wherein the one or more programs are stored in the memory and configured to be executed by the one or more processors; and
the one or more programs comprises:
an instruction for inputting manufacturing parameters for manufacturing a semiconductor to a neural network model; and
an instruction for training the neural network model to predict at least one of power and delay of the semiconductor based on the input manufacturing parameters,
wherein the training of the neural network model trains the neural network model to predict at least one of the power and delay of the semiconductor within a range of a preset minimum value to maximum value for each of the manufacturing parameters,
wherein the neural network model comprises:
a first neural network model configured to receive each manufacturing parameter and is trained to predict the power of the semiconductor from each received manufacturing parameter; and
a second neural network model configured to receive each manufacturing parameter and is trained to predict the delay of the semiconductor from each received manufacturing parameter,
wherein the inputting of the manufacturing parameters inputs a value obtained by taking a log of the manufacturing parameters to the neural network model; and
loss functions of the first neural network model and the second neural network model is represented by Equation 1 below:

$$L_y = \frac{1}{N} \sum_i^N \left\| \log(O_y^i) - \log(D_y^i) \right\|^2, y = \text{power or delay} \quad \text{[Equation 1]}$$

where $L_y$: loss function of the first neural network model when y=power loss function of the second neural network model when y=delay;
N: the number of training data of the first neural network model and the second neural network model;
i: i-th training data;

$\log(O_y^i)$: predicted value of the first neural network model (when y=power) and the second neural network model (when y=delay) for the i-th training data; and $\log(D_y^i)$: target value of the first neural network model (when y=power) and the second neural network model (when y=delay) for the i-th training data.

21. A computer program stored in a non-transitory computer readable storage medium, wherein the computer program including one or more instructions, the instructions that, when executed by a computing device including one or more processors, causes the computing device to:

input manufacturing parameters for manufacturing a semiconductor to a neural network model; and train the neural network model to predict at least one of power and delay of the semiconductor based on the input manufacturing parameters, wherein the training of the neural network model trains the neural network model to predict at least one of the power and delay of the semiconductor within a range of a preset minimum value to maximum value for each of the manufacturing parameters, wherein the neural network model comprises:

a first neural network model configured to receive each manufacturing parameter and is trained to predict the power of the semiconductor from each received manufacturing parameter; and a second neural network model configured to receive each manufacturing parameter and is trained to predict the delay of the semiconductor from each received manufacturing parameter, wherein the inputting of the manufacturing parameters inputs a value obtained by taking a log of the manufacturing parameters to the neural network model; and loss functions of the first neural network model and the second neural network model is represented by Equation 1 below:

$$L_y = \frac{1}{N}\sum_i^N \|\log(O_y^i) - \log(D_y^i)\|^2, y = \text{power or delay} \quad \text{[Equation 1]}$$

where $L_y$: loss function of the first neural network model when y=power, loss function of the second neural network model when y=delay;

N: the number of training data of the first neural network model and the second neural network model;

i: i-th training data;

$\log(O_y^i)$: predicted value of the first neural network model (when y=power) and the second neural network model (when y=delay) for the i-th training data; and $\log(D_y^i)$: target value of the first neural network model (when y=power) and the second neural network model (when y=delay) for the i-th training data.

* * * * *